United States Patent [19]

Bachmann et al.

[11] Patent Number: 5,282,021

[45] Date of Patent: Jan. 25, 1994

[54] VIDEO HUE CORRECTION TAKING ACCOUNT OF SATURATION AND LUMINANCE

[75] Inventors: Peter Bachmann, Aschaffenburg; Mike Christmann, Lierschied; Dieter Poetsch, Ober-Ramstadt, all of Fed. Rep. of Germany

[73] Assignee: BTS Broadcast Television Systems GmbH, Darmstadt, Fed. Rep. of Germany

[21] Appl. No.: 843,551

[22] Filed: Feb. 28, 1992

[30] Foreign Application Priority Data

Feb. 28, 1991 [DE] Fed. Rep. of Germany ....... 4106305

[51] Int. Cl.$^5$ .............................................. H04N 9/64
[52] U.S. Cl. ......................................... 358/28; 358/27
[58] Field of Search ....................... 358/27, 28, 29, 30; 340/703; H04N 9/64, 9/68, 9/69

[56] References Cited

U.S. PATENT DOCUMENTS 3,558,806  1/1971  Monaham et al. ..................... 358/30
4,951,127  8/1990  Mehrgardt et al. ................... 358/28

FOREIGN PATENT DOCUMENTS 8802207  3/1988  World Int. Prop. O. ..... H04N 9/64
9103908  3/1991  World Int. Prop. O. ..... H04N 9/64

OTHER PUBLICATIONS

John F. Monahan and Robert A. Dischert, "Color Correction Techniques for Television Cameras", Sep. 1969, pp. 696-700, Journal of the SMPTE, vol. 78.

Primary Examiner—Mark R. Powell
Assistant Examiner—Glenton Burgess
Attorney, Agent, or Firm—Frishauf, Holtz, Goodman & Woodward

[57] ABSTRACT

A digital color television signal has its chrominance component, which is in the form of color difference signals, resolved into color hue and color saturation signals which are used to address a function memory which provides a pair of correction signals that are supplied to calculator circuits which respectively receive the color hue signal, the color saturation signal and the luminance signal as well as predetermined control signals previously stored which relate to the color sectors adjacent to the color sector in which the color hue signal is located. The calculation circuits respectively supply corrected color hue, color saturation and luminance signals. The color hue signal is additively corrected by a color hue correction signal and the color saturation signal is multiplicatively corrected by a saturation correction signal.

16 Claims, 4 Drawing Sheets

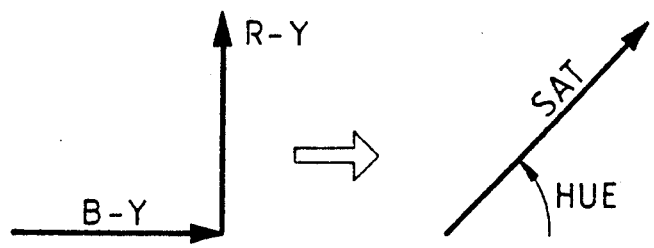
Fig. 2A
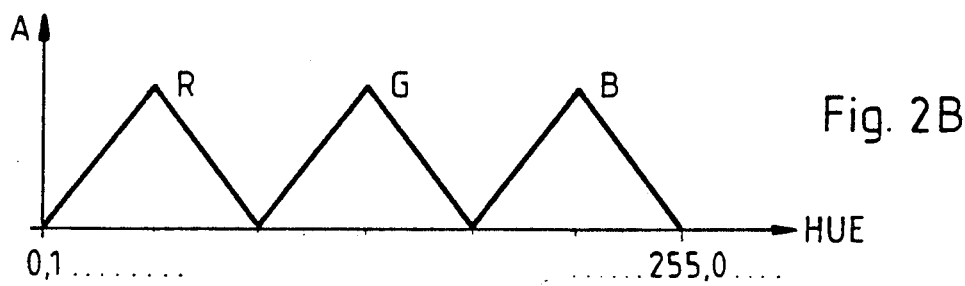
Fig. 2B
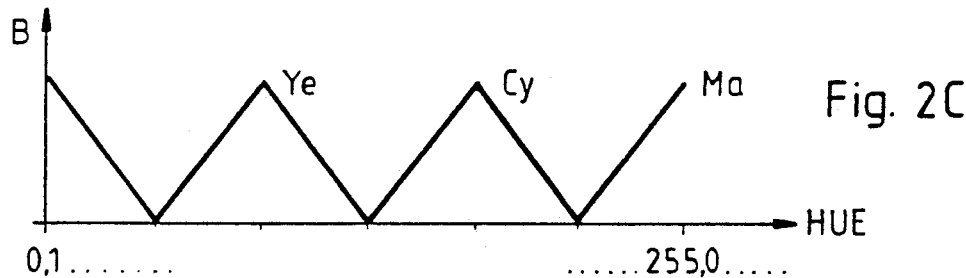
Fig. 2C
| SN(AB) | 1 | 2 | 3 | 4 | 5 | 6 | 1 |
|---|---|---|---|---|---|---|---|
| A | R | | G | | B | | |
| B | Ma | Ye | | Cy | | Ma | |
Fig. 2D

VIDEO HUE CORRECTION TAKING ACCOUNT OF SATURATION AND LUMINANCE

This invention concerns a method and apparatus for color correction of a video signal depending upon the instantaneously designated color hue in the video signal and setting magnitudes derived from other sources.

Television color correction is known in which the amplitudes of color difference signals or color value signals are modified. This modification is produced by a so-called secondary color correction described in U.S. Pat. No. 3,558,806 and in an article by J. Monohan and R. Dischert entitled "Color Correction Techniques for Television cameras" and published in the Journal of the SPMTE, Vol. 78, Sept. 1969, pages 696–700. Such secondary color correction depends upon the color hue represented at the time by the chrominance component of a composite television signal. More particularly, for six different selected color hues correction signals are respectively derived both for color hue and saturation. The correction signals are applied to the chrominance signals of those colors which lie in a color sector on either side of the previously mentioned color hue, so that the latter sectors thereby intersect or overlap the color sector of the previously mentioned hue. The magnitude of the correction signal diminishes more or less linearly with increasing spacing between a color hue of the video signal and the color hue selected from among the six reference color hues. Furthermore, similar processes are known in which color difference signals are corrected in television signals in which the chrominance information is provided by color difference signals.

In known methods and apparatus for secondary color correction, color difference signals, or color value signals in a sector of 120°, are modified by a correction signal, whereby the modification, as just mentioned above, diminishes from the middle to the edge of the 120° sector. The angular position of the correction signal of this sector corresponds, however, to the middle of the sector. If color difference or color value signals of color hues that do not lie in the middle of the sector are modified by the above-described correction signal, there results from additive or multiplicative correction, in the case of color hue correction a saturation error and in the case of saturation correction a color hue error, in addition to the desired correction.

SUMMARY OF THE INVENTION.

It is an object of the p .resent invention to provide a method and apparatus for color correction of a video signal in which correction signals are derived from the color hue contemporaneously represented in the video signal and in a manner dependent upon setting magnitudes designed to prevent saturation and hue errors.

Briefly, a video signal which includes a color hue signal, a color saturation signal and a luminance signal has its color hue signal additively corrected by a color hue correction signal and its saturation signal multiplicatively corrected by a saturation correction signal.

The method of the invention has the advantage that with the correction of saturation the color hue is not falsified and also that a color hue correction does not lead to a change of saturation of those colors which do not correspond to the selected color hue. Apparatus for carrying out the method of the invention is distinguished by an advantageous processing which is possible for a digital video signal. In that way the method of the invention can be carried out with relatively slight circuit expense.

As a further development of the invention, the luminance component of the composite video signal is multiplicatively corrected by a luminance correction signal. In the case of a video signal which has a luminance component and two color difference components, that video signal is, before color correction, converted into a color hue signal, a color saturation signal and a luminance signal.

BRIEF DESCRIPTION OF THE DRAWINGS.

The invention will now be further described, particularly with respect to the apparatus of the invention, by way of illustrative example, in the annexed drawings, in which:

FIG. 2A is a graphical representation showing the relation of color hue and saturation measures to color difference signals;

FIG. 2B is a graphical representation of the color hue signal based on a red, green and blue color system;

FIG. 2C is a graphical representation of color hue in terms of a yellow, cyan and magenta color system;

FIG. 2D is a table showing the comparison of the hue signals of the respective systems illustrated in FIGS. 2B and 2C;

Figure 1:
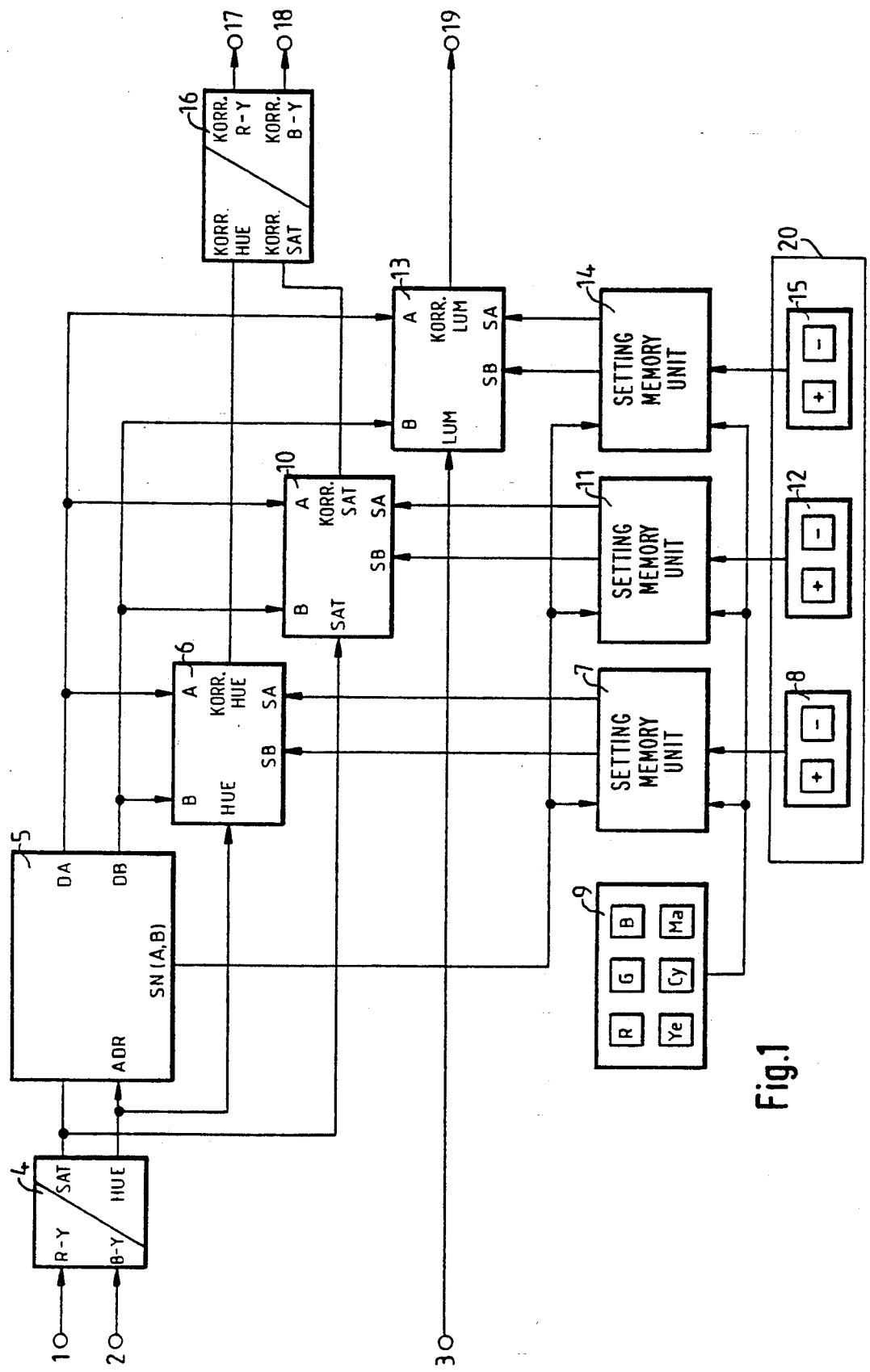
FIG. 1 is a circuit block diagram of apparatus for carrying out the method of the invention.

The reference symbol R, G, D, Ye, Cy and Ma, as well as the letters A and B, have the same significance in FIG. 1 and in FIGS. 2B, 2C, 2D and 3.

DESCRIPTION OF THE ILLUSTRATED EMBODIMENT.

The apparatus of FIG. 1 makes possible a correction of the color difference signals R-Y and B-Y and of the luminance signal Y which are supplied respectively to the inputs 1, 2 and 3 of the apparatus. For carrying out the method of the invention, the color difference signals are converted, in a circuit 4, into a saturation signal SAT and a color hue signal HUE. Such a conversion is in itself well known and produces a transformation of the chrominance components R-Y and B-Y which, as shown in FIG. 2A, are treated as being mutually perpendicular, into a representation of chrominance in a polar coordinate system in which the SAT signal signifies the length and the HUE signal the angle of a vector.

The video signals provided to the input of the system of FIG. 1 are digital signals that are 8 bits wide. Of course the invention can also be practiced with analog video signals or with digital signals that are quantized more finely or more coarsely. The coding of a color hue signal HUE can advantageously be performed by a system in which the entire range of values of the digital signal (0 ... 255 in the case of 8-bit coding) is allocated to the complete color circle. By ignoring an overflow it is then possible to provide any desired angular addition.

The color hue signal HUE is supplied to an address input ADDR of a function value memory 5 in which the degree of the correction is stored as a function of the color hue. In the known secondary color correction mentioned in the introduction portion of this specification the correction of color hues that lie between selected reference color hues always depends on correction values of two neighboring selected color hues. For this reason, in the function value memory 5 two functions are stored, of which, respectively, values dependent upon the hue at the data outputs DA and DB of the memory 5 are made available. The stored function values for such a triangular format correspond to the known systems mentioned in the introduction and are illustrated in FIGS. 2B and 2C. As may be convenient, however, functions can be stored in the function memory 5 which differ from those just mentioned, for example functions corresponding to trapezoidal or Gaussian distribution of color values. The stored function could also be irregular and different for the individual sectors.

A further output SN(A, B) of the memory 5 is shown in FIG. 1 from which information can be obtained signifying which one of the six combinations of respective sectors A and B shown in FIG. 2D is related to the function values simultaneously present at the outputs DA and DB. The dependence of the signal SN(A,B) on the color hue signal HUE and the correlation of the color hue regions (sectors) to the outputs DA and DB and to the respective signals SA and SB are consistent with the relation of the A sectors and B sectors illustrated in FIG. 2D.

The circuits described in what follows are for color hue, color saturation, and luminance corrections which are simultaneously produced. For correction of the color hue a calculating circuit 6, a setting memory unit 7 and a manual setting or control unit 8 are provided. Furthermore, for the three kinds of corrections, in common, a color sector manual selection unit 9 is furnished. The setting memory selection unit 7 contains a memory with a common up/down counter for the subsectors 1, 2 ... 6 designated in FIG. 2D, for the setting or control values which are set by loading the counter with the actual (existing) value of the selected subsector, incrementing or decrementing the counter by actuation of the manual setting unit 8 and transferring the count value to the subsector memory.

For such settings, the subsector for which a setting is to be made is selected by designating the corresponding A and B sectors by manipulating the sector selection unit 9 and then, by means of the manual setting unit 8, a magnitude stored in the corresponding memory in the setting memory unit 7 is incremented or decremented until the desired setting magnitude is reached. This method has the advantage that by means of a few simple keyboard elements the setting magnitudes can be put into memory. The manual setting unit 8 is combined with other setting units 12, 15 in a keyboard unit. The setting can also be provided on a keyboard that operates through a computer, in which case the keyboard would be accordingly different. The memories represented by counters in the unit 7 (see FIG. 3) do not need to be counters and other kinds of alterable memories may be used.

In a manner dependent from the signal SN(A,B) the setting magnitudes (reference hues) SA and SB corresponding to the an A sector memory and a B sector memory are read out of the memory of the selection unit 7 and supplied to the calculating circuit 6. There by means of the setting magnitudes and the function values DA and DB read out of the memory 5 the correction signal (DA·SA)+ (DB·SB) is produced, so that the corrected color hue signal KORR.HUE=HUE+(DA·SA)+(DB·SB) is produced.

Figure 3:
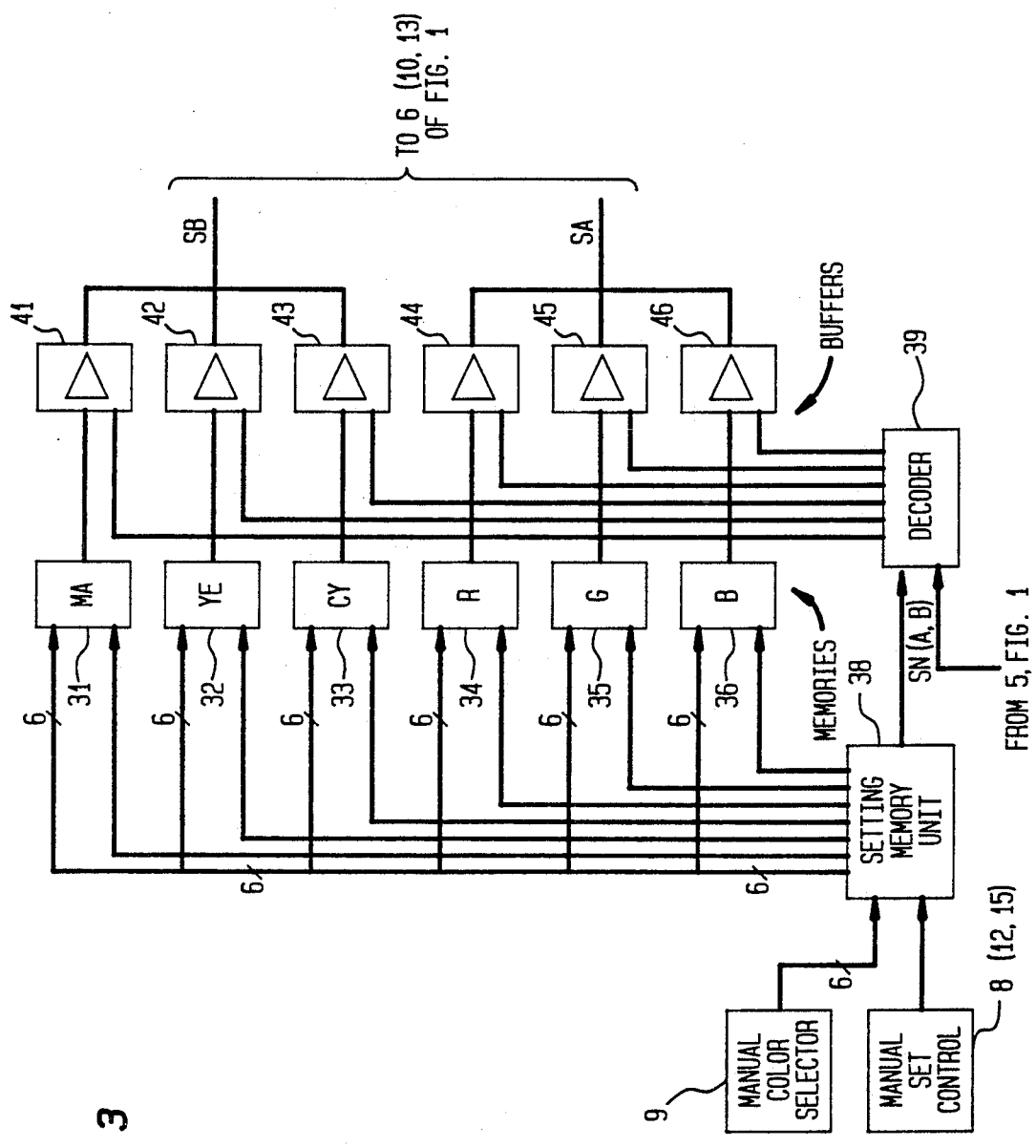
FIG. 3 is a circuit block diagram of the selection unit 7 of FIG. 1 having parenthetical numerals relating to the similar selection units 11 and 14.

The setting memory unit 7 is shown in more detail in FIG. 3. The six subsector memories 31, 32 ... 36 are identified with letters designating the color sector in a manner consistent with FIG. 2D. The sectors for magenta yellow and cyan straddle the respective boundaries blue-red, red-green and green-blue as shown in FIG. 2D. The memories 31-36 are 8-bit memories having the corresponding 120° upper and lower count limits for maximum and reset values. The particular memory to be modified is selected manually by pressing two buttons on the sector selection unit 9 (see FIG. 1) but that only, clears a path to that sector memory for which a count alteration signal may be sent to the selected memory in the particular setting memory selection unit 7, 11 or 14. The buttons on the manual setting units 8, 12 and 15 are normally in their neutral position. Depressing the + or − on the side of the button will increment or decrement the particular memory counter designated by the manual color selector unit 9 but does so only in the setting memory selection unit 7, 11 or 14 to which the incrementing or decrementing button corresponds. The memory setting circuit 38 shown in FIG. 3 contains a switching system for directing the incrementing or decrementing values from the unit 8 to the memory designated by the manual color selection unit 9.

Figure 4:
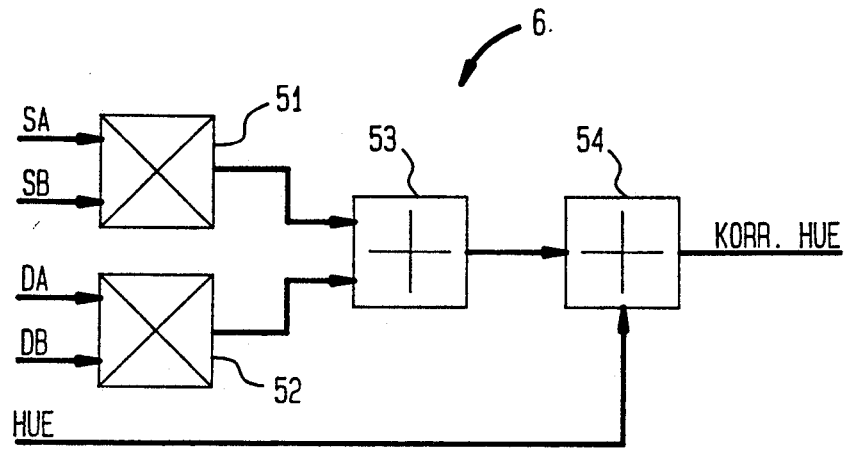
FIG. 4 is a circuit block diagram of the calculating circuit 6 of FIG. 1.

Another input signal to the setting memory selection units 7, 11 and 14 shown in FIG. 1 is a signal SN(A, B). This relates to the fact that the memory 5 operates to provide two correction outputs at each of the outputs DA and DB for each hue correction, one selected from a memory in the group 31, 32 and 33, which may be called the A group and one from a memory of the group 34, 35 and 36 which may be called the B group. The signal SN(All B) produced by the memory 5 shows which contemporary correction outputs of the memory 5 are to be found at its outputs DA and DB. In each operation of the setting memory unit 7 a memory of group A and a memory of group B will be selected depending on the signal SN(A, B) and form the outputs SB and SA . In the case of the setting memory selection unit 7, those outputs go to the calculating circuit 6. As shown in FIG. 4 the data signal DA of the memory 5 is multiplied by a signal SA from a sector memory of the unit 7 in the digitial multiplier 51 and the data output DB from the memory 5 is multiplied by the signal SB from a sector memory in the unit 7 to the second multiplier 52. The two resulting digital products are added in the adder 53 to produce a correction and that correction is then added to the hue signal from the converter 4 of FIG. 1, to produce the sum which is the corrected hue signal KOOR.HUE.

Figure 5:
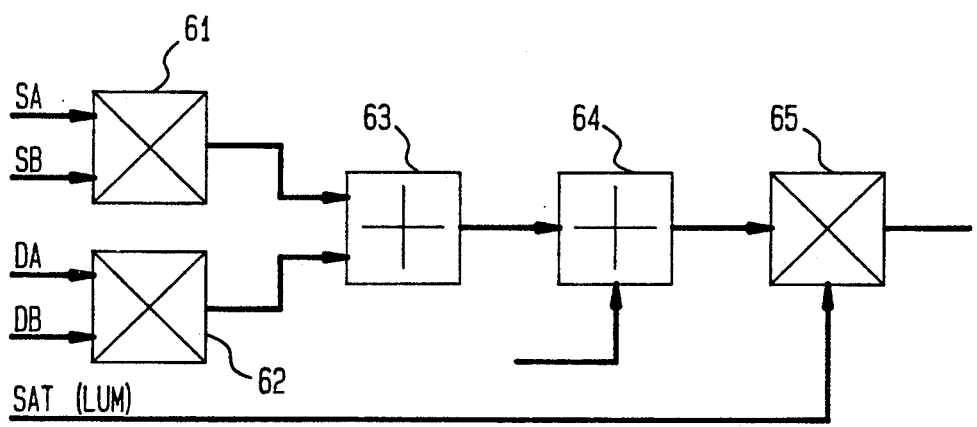
FIG. 5 is a circuit block diagram of the calculating circuit 10 of FIG. 1 having parenthetical numerals relating to the similar calculating circuit 13.

FIG. 5 shows a calculating circuit 10 and also the calculating circuit 13. In FIG. 5 the first multiplier 61 and the second multiplier 62 apply the same multiplications as in the case of FIG. 4 except that the signals SA and SB now come from the counters contained in the setting memory selection unit 11 controlled by the manual units 9 and 12 of FIG. 1. In the case of calculation circuit 13 the signals come from the setting memory selection unit 14 controlled by the manual units 9 and 15. The outputs of the first and second multipliers 61, 62 are added in the adder circuit 63 and then are incremented by one in the adder 64, the output of which is then multiplied by the saturation signal on the converter 4 in the case of the calculation circuit 10 or by the luminance signal from the terminal 3 in the case of the calculation circuit 13. This multiplication takes place in a third multiplier 65 and produces a corrected saturation signal in the case of the calculation circuit 10 and a corrected luminance signal in the case of the calculation circuit 13.

It is significant that in contrast to the calculation circuit 6, the calculation circuit 10 multiplicatively corrects the correction signal SAT as shown in FIG. 5 and does so according to the following equation:

$$KORR.SAT = SAT \cdot [(DA \cdot SA) + (DB \cdot SB) + 1].$$

The corrected luminance signal KORR.LUM is similarly made available at an output 19. The corrected color hue signal KORR.HUE and the corrected saturation signal KORR.SAT are converted in a coordinate transformation circuit 16 to color difference signals KORR. R−Y and KORR. B−Y and are made available at respective outputs 17 and 18 for further processing or transmission. The coordinate conversion of the circuit 16 is the converse of the coordinate conversion performed in the circuit 4.

The manual setting values can obtained by test runs of the system beginning with calculated or estimated values and ending with values that are as accurate as possible within the limits set by the quantization of the digital signals.

Although the invention has been described with reference to a particular illustrative embodiment, it will be recognized that modifications and variations, some of which have been mentioned above, are possible within the inventive concept.

We claim:

1. A method of color correction of a video signal, comprising the steps of
   providing the chrominance information of said video signal in the form of separate saturation and hue signals to a function generating memory in which functions are respectively stored for producing, for each of a multiplicity of hue signal values, first (DA) and second (DB) function value signals respectively related to different color reference signals in each of two color sector in part adjacent to each other and in an overlap of which the hue signal belongs;
   providing said hue signal and said first and second function value signals (DA, DB) to a first calculation circuit (6) to which are provided predetermined first and second control signals (SA, SB) respectively pertaining to said in part adjacent color sectors and therewith additively correcting said hue signal for thereby producing a corrected hue signal at an output of said first calculating circuit;
   providing said color saturation signal and said first and second function value signals (DA, DB) to a second calculating circuit (10) to which are provided predetermined third and fourth control signals (SB', SA') respectively pertaining to said in part adjacent color sectors and therewith multiplicatively correcting said saturation signal for thereby producing a corrected saturation signal at an output of said second calculating circuit (10), and
   converting, in a polar to rectangular coordinates conversion circuit, said corrected hue and corrected saturation signals into corrected chrominance signals (KORR.R−Y, KORR.B−Y).

2. The method of claim 1, wherein said video signal has a luminance signal component, wherein a third calculating circuit provided and wherein:
   said luminance signal component of said video signal is corrected in said third calculation circuit, to which said first and second function value signals (DA, DB) are supplied and also predetermined fifth and sixth control signals (SA", SA") respectively pertaining to said adjacent color sectors, for therewith additively producing a corrected luminance signal at an output of said third calculating circuit.

3. The method of claim 1, wherein said video signal is provided in the form of a luminance signal and two color difference signals and a preliminary step is performed of converting values of said video signal, in another conversion circuit (4), from rectangular coordinates into values in polar coordinates and thereby producing a color hue signal and a color saturation signal.

4. The method of claim 2, wherein said video signal is provided in the form of said luminance signal component and two color difference signals and a preliminary step is performed of converting values of said video signal, in another conversion circuit (4), from rectangular coordinates into values in polar coordinates and thereby producing a color hue signal and a color saturation signal.

5. The method of claim 1, wherein first and second signal selection circuits (7, 11) are provided, which are each connected with a manual input keyboard (8, 12) and supplied with a color sector reference color signal input from a common manual keyboard (9) and an input from said function generating memory (5) for a signal SN(A,B) signifying to which of said partly adjacent color sectors (A, B) said first and second function values (DA, DB) relate, and wherein first and second pairs of selected control signals respectively selected in said first and second control signal selection circuits are preliminarily selected by means of said manual input keyboards in a preliminary step of the method.

6. The method of claim 2, wherein first, second and third control signal selection circuits (7, 11, 14) are provided which are each connected with a manual input keyboard (8, 12, 15) and supplied with a color sector reference color signal input from a common manual keyboard (9) and an input from said function generating memory (5) for a signal (SN(A,B) signifying to which of said partly adjacent color sectors (A, B) said first and second function values (DA, DB) relate, and wherein first, second and third pairs of control signals respectively selected in said first, second and third selected control selection circuits are preliminarily selected by means of said manual input keyboards in a preliminary step of the method.

7. Apparatus for deriving corrected values of digital color hue and color saturation signals representing the chrominance signal of a composite color television signal, which also has a luminance signal, said apparatus comprising:
   a digital function value memory (5) addressable by said digital color hue and color saturation signals in which correction values are respectively stored with regard to reference color hues in two different mutually overlapping color sectors having an overlap in which said digital color hue signal belongs;

first (7, 8) and second (11, 12) selection circuits, respectively for said color hue signal and said color saturation signal, each having two outputs and in each case providing stored control values from which in each case two (SA, SB; SA', SB' are selectable which respectively appear at said outputs and respectively correspond to said overlapping color sectors;

first and second calculation circuits (6, 10,) having inputs respectively connected, in each case, to said outputs of said first and second selection circuits and additional inputs respectively supplied with said color hue signal and said color saturation signal as well as inputs connected to respective outputs (DA, DB) of said function value memory (5) at which a pair of said stored correction values regarding said overlapping color sectors are furnished, for calculating in each case, from said pair of correction values read out from said function value memory (5) and of a pair of control valued (SA, SB; SA', SB') selected by said selection circuit (7, 8; 11, 12), respectively, a corrected color hue signal calculated from said first calculation circuit (6) and a corrected color saturation signal calculated by said second calculation circuit (10).

8. The apparatus of claim 7, wherein said selection circuits are provided, for specifying in which of several sectors the color hue signal is to be found, with sector information relating to sectors which overlap each other by half of the angular magnitude of the sectors, and wherein said function value memory (5) stores two values for each color hue address, which are both supplied to said first and second calculation circuits in response to a color hue address through electrical connections and wherein said first and second selection circuits are each constituted to provide a selected control value for each of pair of overlapping sectors which contains, in the overlap of said pair of overlapping sectors, the hue corresponding to said color hue signal.

9. The apparatus of claim 8, wherein each said selection circuit includes a counter for each control value of a subsector which is one of a complete set of color value subsectors in each of which two said color sectors overlap and wherein keyboard elements (8,12) of said selection circuits are provided for selectively incrementing and decrementing any of said counters in said selection units.

10. The apparatus of claim 7, wherein a conversion circuit (4) is provided at the input of the apparatus for converting color difference signals into a color hue signal and a color saturation signal for supplying them to respective inputs of said function value memory and to said first and second calculation circuits.

11. The apparatus of claim 7, wherein the outputs of said first and second calculation circuits which respectively provide corrected hue and saturation signals are connected to a conversion circuit (16) f or conversion from polar to rectangular coordinates, said conversion circuit having outputs for color difference signals (R−Y, B−Y).

12. The apparatus of claim 7, wherein there are provided:

a third selection circuit (14, 15) for said luminance signal of said video signal, having outputs and providing stored control values from which two (SA"; SB"), respectively corresponding to said overlapping sectors, are selectable for respectively appearing concurrently at said outputs; and a third calculating circuit (10), having inputs respectively connected to said outputs of said third selection circuit, and an additional input supplied with said luminance signal, as well as inputs connected to respective inputs connected to respective outputs (DA, DB) of said function memory (5) at which a pair of said stored correction values regarding said overlapping color sectors are furnished, for calculating a corrected luminance signal from said pair of correction valves read out from said function memory (5) and of a pair of control value (SA"; SB") selected by said third selection circuit (14, 15).

13. The apparatus of claim 12, wherein said selection circuits are provided, for specifying in which of several sectors the color hue signal is to be found, with sector information relating to sectors which overlap each other by half of the angular magnitude of the sectors, and wherein said function value memory (5) stores two values for each color hue address, which are both supplied by electrical connections to said first, second and third calculation circuits in response to a color hue address and wherein said first, second and third selection circuits are each constituted to provide a selected control value for each of a pair of overlapping sectors which contains, in the overlap of said pair of overlapping sectors, the hue corresponding to said color hue signal.

14. The apparatus of claim 13, wherein each of said selection circuit includes a counter for each control value of a subsector which is one of a complete set of color value subsectors in each of which two said color sectors overlap and wherein keyboard elements (8, 12, 15) of said election circuits are provided for selectively incrementing and decrementing any of said counters in said selection units.

15. The apparatus of claim 12, wherein a conversion circuit (4) is provided at the input of the apparatus for converting color difference signals into a color hue signal and a color saturation signal and supplying them to respective inputs of said function value memory and to said first and second calculation circuits, while said luminance signal is provided to said third calculation circuit.

16. The apparatus of claim 12, wherein the outputs of said first and second calculation circuits which respectively provide corrected hue and saturation signals are connected to a conversion circuit (16) for conversion from polar to rectangular coordinates, said conversion circuit having outputs for color difference signals (R−Y, B−Y).

* * * * *